United States Patent [19]

Möller

[11] Patent Number: 4,495,000

[45] Date of Patent: Jan. 22, 1985

[54] DEVICE FOR CUTTING A STRIP CAST IN A CONTINUOUS CASTING MACHINE

[75] Inventor: Karl-Heinz Möller, Obertshausen, Fed. Rep. of Germany

[73] Assignee: Messer Griesheim GmbH, Frankfurt, Fed. Rep. of Germany

[21] Appl. No.: 166,048

[22] Filed: Jul. 7, 1980

[30] Foreign Application Priority Data

Aug. 30, 1979 [DE] Fed. Rep. of Germany ....... 2935029

[51] Int. Cl.³ .......................... B23K 7/02; B23K 7/10
[52] U.S. Cl. ..................................... 148/9 R; 266/50
[58] Field of Search ...................... 148/9 R, 9 C, 9.6; 266/50

[56] References Cited

U.S. PATENT DOCUMENTS

| 4,033,558 | 7/1977 | Flückiger | 266/50 |
| 4,074,895 | 2/1978 | Capriotti | 266/50 |
| 4,202,707 | 5/1980 | Hennecke | 266/50 |

Primary Examiner—W. Stallard
Attorney, Agent, or Firm—Connolly and Hutz

[57] ABSTRACT

A device for cutting a continuously cast strip conveyed on a roller bed includes a cutting machine having at least one flame cutting unit. A control unit controls the transverse movement of the flame cutting units in such a way that the flame cutting units are always between individual rollers during the cutting operation.

9 Claims, 2 Drawing Figures

DEVICE FOR CUTTING A STRIP CAST IN A CONTINUOUS CASTING MACHINE

BACKGROUND OF INVENTION

For the further processing of continuously cast strips, it is necessary to cut the strip into appropriate pieces. The flame cutting machine, coupled with the strip (e.g., by means of a clamping device), is moved along at the casting velocity and cuts the strip being moved on a stationary roller bed by means of its cutting torch unit(s) which are moving in a crosswise direction.

Due to this transverse movement of the flame cutting unit during the simultaneous longitudinal motion of the machine, the resultant cutting path of the cutting torch unit runs obliquely over the roller bed. During the motion along this oblique cutting path, there is a constant danger that the roller bed, specifically the rollers that are in direct contact with the strip, are damaged by the cutting oxygen jet of the flame cutting units.

It is already known from West German Auslegeschrift No. 12 36 304 that this can be prevented by giving the rollers a smaller diameter relative to their circumferential surface on part of their length and by confining the path of the cutting tool over the breadth of the roller table to within the reduction of the roller diameter. Thus, a kind of "cutting line" is formed within the roller table, over which line the cutting tool moves and thereby avoids damaging the rollers.

A corresponding solution is also described in the West German Offlengungsschrift No. 25 35 950, according to which the cutting table has a gap, whose dimensions are chosen to be such that at the given maximum and minimum velocities of the cutting device, as well as of the workpiece to be cut, the cutting device is moving within this gap.

In this state of the art (West German Ausleschrift No. 12 36 304 and West German Offlengungsschrift No. 26 35 950), it is consequently necessary to prepare the roller bed (formation of a cutting line/gap) in such a way that the cutting device will always be within a predetermined zone.

SUMMARY OF INVENTION

According to this state of the art, the present invention has as its basic object creating a device of the above type in such a way that without structural modification of the roller bed, i.e., without the formation of a special cutting line/gap, the cutting through of a workpiece or strip is possible without damage to the rollers by the cutting, oxygen jet of the flame cutting unit or cutting torch units.

In accordance with this invention a control unit, such as a computer, controls the cutting speed of the flame cutting units so that the units are always between individual rollers during the cutting operation.

THE DRAWINGS

FIG. 1 is a schematic view of a device in accordance with this invention for cutting a continuously cast strip; and FIG. 2 is a top view of the roller bed including the cutting zone according to the present invention.

DETAILED DESCRIPTION

Figure 1:
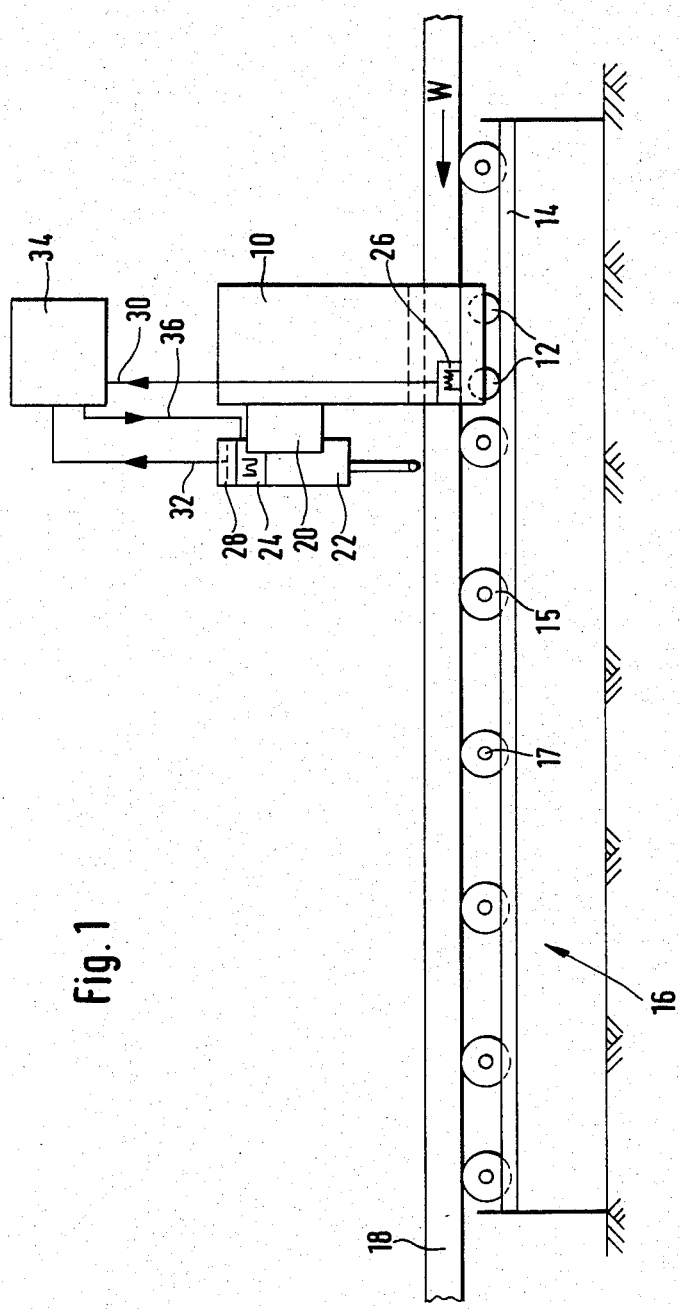

A flame cutting machine 10, which moves by means of its wheels 12 on the guide rails 14 (one of which is shown) is shown in FIG. 1. Between the guide rails 14 there is a roller bed 16 (cf. FIG. 2), on which a strip 18 is moving at the velocity of casting in the direction of the arrow W. The velocity of casting and thus the strip velocity is usually on the order of 0.6 to 2.5 m/minute. The width of such a strip usually ranges from 0.6 to 2.5 m at a thickness of 0.1 to 0.35 m.

The flame cutting machine 10, which is clamped to the strip during the flame cutting operation, serves for cutting the strip 18 into individual pieces. Instead of clamping, it is also possible to synchronize the movements of the strip and of the machine by means of an electrical impulse by placing the machine on the strip, etc. It is, however, of decisive importance that in order to achieve perfect cutting, the machine and the strip must always move at the same velocity.

As is shown in FIG. 1, the flame cutting machine 10 has a crossbeam 20 mounted on it, on which two flame cutting units 22 (in the embodiment shown) are mounted, which are movable in the transverse direction, i.e., at right angles to the direction of motion of the strip 18. It is possible to use one flame cutting unit instead of two; the single unit can also be in the form of a swinging unit in the case of strips with small cross sections.

A drive motor 24, which moves the unit at the cutting velocity via a gear-toothed rack combination (not shown), serves for the transverse movement of the flame cutting unit. This cutting velocity is usually in the range of 50 to 1,000 mm/minute and is dependent, among other things, on the temperatures of the strip to be cut, its thickness, and on the type of the material.

As is shown in FIG. 1, there is an impulse sender 26 in the zone of the wheel 12. Sender 26 monitors the longitudinal motion of the machine 10 along the guide rails 14. One impulse sender 28 is also provided for each flame cutting unit 22; these senders monitor the transverse motion of the units.

The impulse senders 26, 28 are connected with a so-called control computer 34 via the cables 30 and 32, and form together with the computer 34 a control unit, by means of which the cutting velocity of the flame cutting units 22 is controlled during the cutting operation in a manner to be described below in such a way that the roller bed 16 is not damaged by the cutting oxygen jet of the units.

In order thus to influence the cutting speed, the control computer 34 is connected with the drive motor 24, which moves the cutting unit 22 in the transverse direction, via another cable 36. Through adequate control of the drive motor, the latter changes the cutting speed of the flame cutting unit during the cutting operation.

Figure 2:
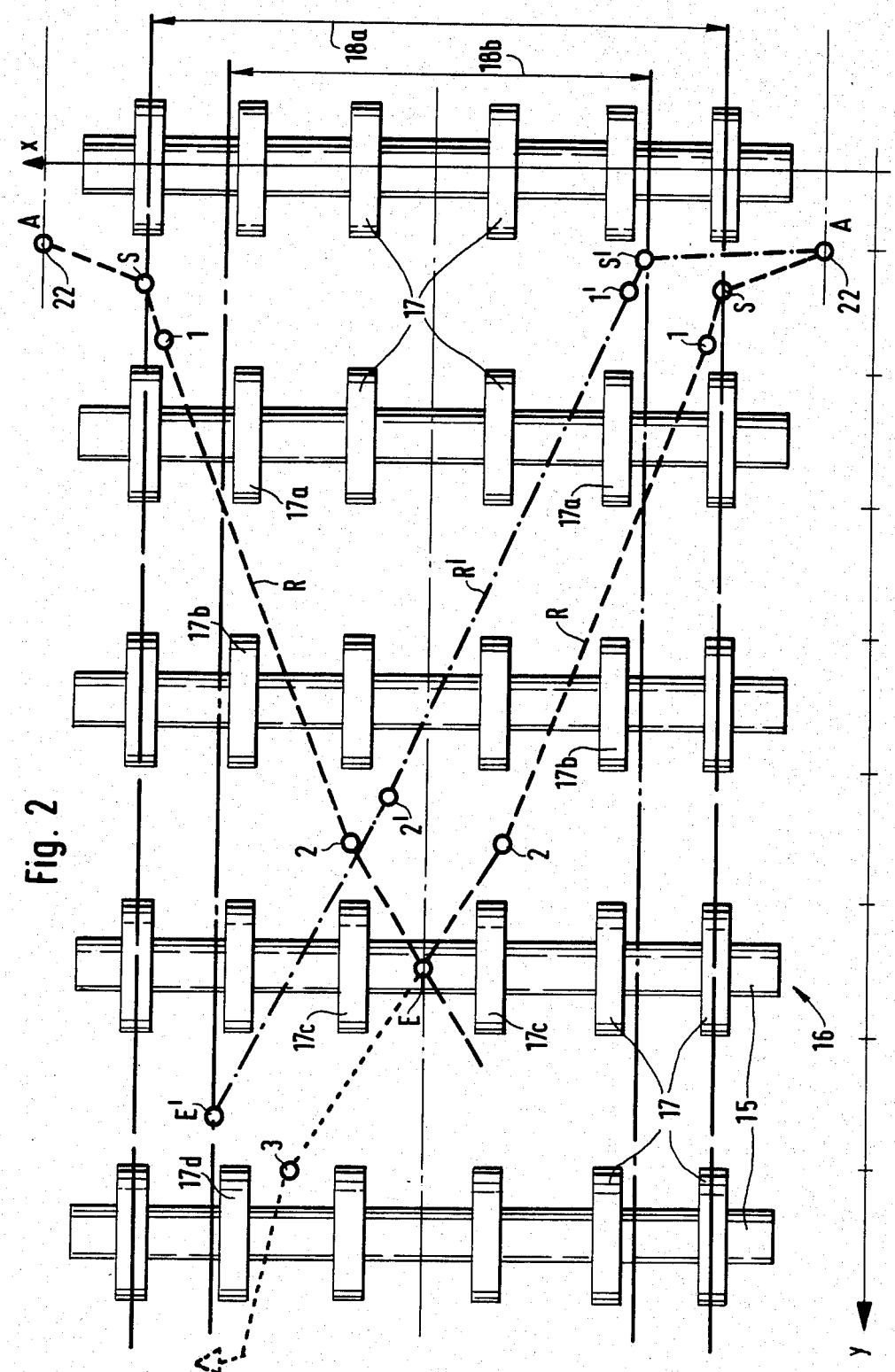

A simplified top view of the roller bed 16 is shown in FIG. 2. This roller bed has several shafts 15, which are equidistant from each other, on which numerous disks or rollers 17 are fastened, which are also separated from each other by a predetermined distance. The disks 17 serve for supporting and further transporting the strip 18 to be cut, which is illustrated in FIG. 2 schematically with two breadths, namely 2.20 m (reference 18a) and 1.60 m (reference 18b).

At the beginning of the severing process, the two flame cutting units 22 (illustrated in FIG. 2 by the cross-section of the cutting nozzle) are in their starting position. This starting position is constant relative to the roller bed 16 and is therefore fed into the control computer 34 by means of an x-y coordinate system (cf. FIG. 2). Since the distances between the shafts 15 and the disks 17 also fail to change in a given roller bed 16, i.e., these distances are fixed values, these values, i.e., the positions of the rollers 15 and their dimensions, are also determined by the same x-y coordinate system. These roller coordinates are also stored in the control computer 34.

Aside from these above-mentioned fixed values, the variable values, such as the cutting speed which is the speed with which the flame cutting unit 22 is moving on the crossbeam 20 across the longitudinal motion direction of the strip, are also fed into the computer. This necessary, optimal cutting speed is determined in advance for the specific cutting task, because this speed depends, as aforementioned, on the type of material, the strip temperature, and the thickness of the strip. Thus, for example, the optimal cutting speed (which can be determined from tabulated values) can be chosen at 0.4 m/minute for a strip having a temperature of 800° C. and consisting of structural steel with a thickness of 250 mm.

The breadth (0.6 to 2.6 m) of the strip to be cut is also fed into the control computer 34. This is important for moving the flame cutting units 22 from their starting position into the starting cutting position on the strip.

Finally, the actual casting velocity (0.6 to 2.5 m/minute), i.e., the velocity with which the strip 18 and together with it the flame cutting machine 10 are moved relative to the stationary roller bed 16, should also be fed into the control computer 34, since this velocity is an essential criterion.

Furthermore, the length of the flame cutting path, i.e., the distance over which the machine travels along the guide rails 14 (in FIG. 2: y axis of the coordinate system), during the flame cutting operation shall also be stored, as another variable, in the control computer, regardless of whether two flame cutting units operating in opposite directions or only one flame cutting unit are used.

After these fixed and variable values are fed into the control computer, the machine is ready to operate. Upon start up of the machine, and after it is clamped, the two flame cutting units 22 move from their starting position A in rapid traverse, driven by the drive motor 24, into the starting cutting position S on the strip 18a. After preheating, the actual flame cutting operation is started.

Now, the flame cutting units are moving at the preset optimal cutting speed (e.g., 400 mm/minute) toward each other (motion in the direction of the x axis in FIG. 2), while at the same time the machine is being moved at the speed of casting in the direction of the y axis.

These two velocities determine two resultants R (shown in FIG. 2 by broken lines), which later meet in the center of the strip.

Based on the fixed input values and the values being fed steadily into the control computer by the impulse senders 16, 28, which concern the actual positions of the machine and of the flame cutting units relative to the roller bed on the basis of the coordinate system, the control computer determines an actual cutting speed, which is different from the optimal cutting speed fed in, which actual cutting speed guarantees that none of the disks 17 is cut by the flame cutting units. The resultants R correspond to the actual path of the flame cutting units during the cutting process.

Thus, in the embodiment shown, a slight correction of the optimal cutting speed of the drive motor 24 is necessary shortly after the start of the cut, at point 1, i.e., their cutting speed is increased slightly in this case. This increase causes, as is shown in FIG. 2, a somewhat steeper resultant R relative to the y axis beginning from point 1 compared with the resulting section E-1. This "path correction" via a slight increase in the cutting speed to above its optimal value thus guarantees, according to the present invention, that the two disks 17a and 17b, which are closest, remain outside the resultant R and thus outside the action zone of the flame cutting unit, and thus they are not damaged by the cutting oxygen jet.

As is seen, another correction of the cutting speed is necessary shortly before the end of the cut, namely, at point 2. In order to prevent the roller 17c from being cut, the cutting speed is therefore again increased slightly at point 2, i.e., the flame cutting units are moved by the drive motor 24 at a somewhat higher speed in the direction of the x axis (FIG. 2). This increase is illustrated in FIG. 2 through the section 2-E, which is again slightly steeper than the resultant section 1-2.

When point E is reached, the strip would be severed and the cutting operation terminated. For structural reasons, however, it is impossible to let both flame cutting units move to "zero" distance. Therefore, the lower flame cutting unit shown in FIG. 2 stops shortly before reaching a minimum distance, i.e., shortly after point 2, while the upper flame cutting unit completes and terminates the cut beyond the middle of the strip.

The dash-dotted line going beyond the point E illustrates that, e.g., in the case of failure of the upper flame cutting unit, the cut can also be completed by the lower flame cutting unit alone. In this case, it would be necessary to reduce the cutting speed in order to prevent damage to the disk 17d (point 3) so that the flame cutting unit is moved past the disk 17d, as is shown by the resultant R.

When severing small strips, e.g., 18b or even smaller ones, a single flame cutting unit 22 may be sufficient. The actual path of this unit is illustrated by the dash-dotted resultant R' with the points A, S', 1', 2' and E'. The transverse motion of a single flame cutting unit is controlled in the same manner as was described above.

By controlling the transverse motion of the flame cutting units according to the present invention, i.e., by increasing and/or decreasing the optimal cutting speed via the control unit connected with the drive motor 24, it is guaranteed in an advantageous manner that strips of different dimensions and with different parameters, such as casting speed, type of material, strip temperature, single-cutter or two-cutter operation, etc., can always be cut optimally on the same roller bed and without the flame cutting unit or flame cutting units damaging any disks during the cutting process.

The problem with which the invention is concerned and its manner of solving that problem may be summarized as follows. During the severing of a continuously cast strip 18, the flame cutting machine 10 is moved over the roller bed 16. This creates a danger that the disks or rollers 17 of the roller bed 16 can be damaged by the cutting jets of the flame cutting units 22. To solve this problem, i.e., to avoid damage to the disks 17, it is proposed according to the present invention that as a function of individual parameters, such as the dimensions of the workpiece, casting speed, type and size of the roller bed, etc., the cutting speed of the flame cutting units 22 be controlled by means of a control computer 34, into which these parameters are to be fed, in such a way that the cutting path (resultant R) always lies between the disks, as shown in FIG. 2.

What is claimed is:

1. In a device for cutting through a continuously cast strip produced in a continuous casting installation, consisting of a flame cutting machine with at least one flame cutting unit, a roller bed for transportation of the strip which moves at a constant speed, whereby the flame cutting machine can be coupled to the strip during the flame cutting action, and with a control unit for controlling the lateral movement of each flame cutting unit in a path of travel which is always between the individual rollers of the roller bed during the cutting operation, the improvement being that the speed of the cutting path is within a range which includes the optimum speed, and said control unit comprising impulse senders connected with a control computer and installed at said flame cutting machine to monitor the longitudinal motion of said machine and the transverse motion of said flame cutting unit.

2. Device according to claim 1, characterized in that said control computer is connected with the transverse drive of said flame cutting unit.

3. Device according to claim 2, characterized in that said control computer is capable of having fed thereinto fixed values and variable values of the cutting process.

4. Device according to claim 3, characterized in that the drive motor for said flame cutting unit has its speed determined as a function of the fixed and variable values fed into said control computer.

5. In a method for severing a continuously cast strip which is transported over a roller bed at the casting speed with a flame cutting machine having at least one flame cutting unit being coupled to the roller bed for cutting the strip during the cutting operation, wherein the transverse motion of the flame cutting unit is controlled by means of a control unit in such a way that the unit has a path of travel which is always between individual rollers of the roller bed during the cutting operation, the improvement being in moving each flame cutting unit at a speed in its cutting path which is within a range which encompasses the optimum speed, and impulse senders being connected with a control computer and installed at the flame cutting machine to monitor the longitudinal motion of the machine and the transverse motion of the flame cutting unit.

6. Method according to claim 5, characterized in that the control computer is connected with the transverse drive of the flame cutting unit.

7. Method according to claim 6, characterized in that fixed values and variable values for the cutting process are fed into the control computer.

8. Method according to claim 7, characterized in that as a function of the fixed and variable values fed into the control computer the speed of the drive motor which moves the flame cutting unit in the transverse direction can be increased or decreased.

9. Method according to claim 8, characterized in that the fixed values include the starting position of the flame cutting unit and the coordinates of the rollers and of the roller bed, and the variable values include the cutting speed and the strip breadth and the strip speed.

* * * * *